Sept. 24, 1957         J. GERENTES         2,807,769

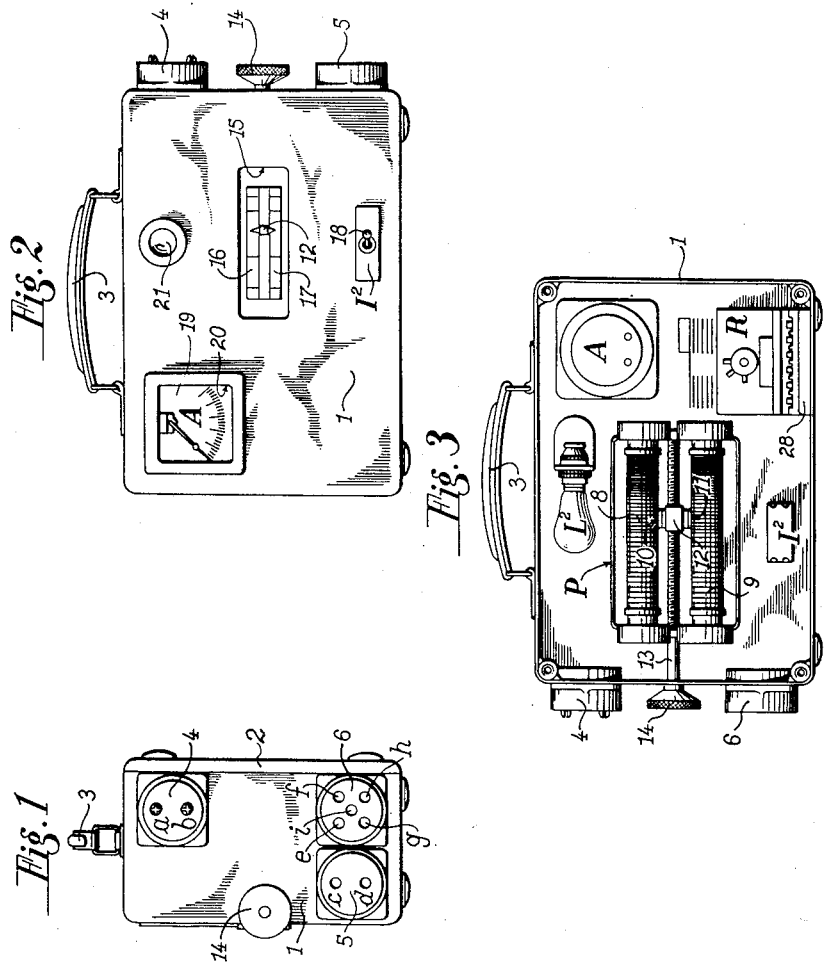

CONTROL APPARATUS FOR AN ELECTRIC MOTOR

Filed Jan. 11, 1955         2 Sheets-Sheet 2

Inventor:
Jean Gérentès
by: J. Delattre
Attorney

United States Patent Office 2,807,769
Patented Sept. 24, 1957

2,807,769

CONTROL APPARATUS FOR AN ELECTRIC MOTOR

Jean Gérentès, Saint-Etienne, France, assignor to Societe des Brevets Wagner, Paris, France, a French body corporate Application January 11, 1955, Serial No. 481,230

Claims priority, application France March 27, 1954

1 Claim. (Cl. 318—474)

The present invention relates to the control of electric motors, in particular those for tube-beading units and other installations.

It is known that in the beading of tubes it is very important to obtain a fluid-tight assembly of all the pipes right from the start of the beading operation, for retouching entails considerable loss of time.

It is also necessary in executing a correct beading, not to over-expand the tube which would result in a considerable thinning down of the wall of the tube as well as an undesirable increase in the size of its seating due to exceeding the elastic limit of the metal of the plate.

Thus, it is necessary to obtain absolutely identical tube beadings and to reproduce exactly on all the tubes the beading found to be correct on the first tube. This may be obtained in acordance with conventional methods by observing either the decrease in thickness of the wall of the tube or its elongation, this being a skilled operation. Alternatively, a sample tube may be beaded in a plate and thereafter subjected to a fluid-tightness test. If all the beadings are effected with the maximum torque observed in respect of the first tube, all the tubes should be beaded or inserted to the same degree.

Hence, a correct beading operation depends firstly on suitably ascertaining the value of the required maximum torque.

For this purpose there has already been proposed:

A mechanical method based on an effect of friction adjusted to the required torque imparted to the driven member;

An electrical method based on the measurement of the maximum current intensity consumed by the electric motor at the end of the inserting operation.

In this last method it is of course necessary to ascertain said intensity in a precise manner so as to obtain identical results on all tubes.

In the electrical device usually employed the beader is driven at the required speed by the motor, which is started up by a switch box. In the course of beading the current intensity gradually rises up to the value corresponding to the maximum torque and the motor is stopped by means of a maximum-intensity coil having an adjustable air gap which attracts a lever connected to a switch, the latter causing the current to be cut off. Once the operation is terminated, the beader may be withdrawn by depressing the reverse button of the switch box; the apparatus is then ready for another operation.

With such a device it is necessary initially to connect the attracting or maximum-intensity coil in parallel so that the starting current does not pass therethrough.

This method of electrical control requires relatively bulky equipment enclosed in a heavy case which is difficult to transport.

Further, the different values of the intensity correspond to different air-gaps. Thus, it is very difficult to adjust for intensities of low value owing to the smallness of the air-gap.

Indeed, if I is the maximum intensity consumed and N the number of turns of the coils, it is known that $$1.25\, NI = H \times e$$

where H is the field in the air-gap and $e$ is the value of the latter. Since the force of attraction is proportional to the square of H which is itself inversely proportional to $e$, it follows that if $e$ is very small a small variation will bring about a large variation in the force of attraction; whence the considerable difficulty experienced in adjusting.

The invention has for object to provide an electrical control apparatus for a beading unit based on the maximum torque method, this apparatus being improved in such manner as to permit ascertaining in a simple and precise manner the cutoff point corresponding to the desired maximum torque and thus obtaining a succession of simple and practical operations which facilitate the execution of a rapid beading. This apparatus, which comprises, furthermore, a control unit which is light and easily transportable and easily made available to the operator, is more particularly intended for light beading operations in which the driving motor utilized is supplied with direct or single-phase current.

A further object of the invention is to provide a control apparatus comprising a main movable switch having relays and an adjustable potentiometer, series-connected in a circuit which is adapted to connect the terminals of the motor to control to an electric source, a coil of said relay being connected, through a rectifier, to the terminals of said potentiometer and this relay being adapted to open said switch when the voltage between these terminals and therefore the intensity of the rectified current in said coil, attain given maximum values.

Further features and advantages of the invention will be apparent from the ensuing description with reference to the accompanying drawings, given merely by way of example and in which:

Fig. 1 is an end view of an apparatus embodying the invention which is in the form of a small valise;

Fig. 2 is an elevational view of one of the large sides of this valise;

Fig. 3 is a view of the opposite side of this valise, the wall forming a cover having been removed.

Figure 4:
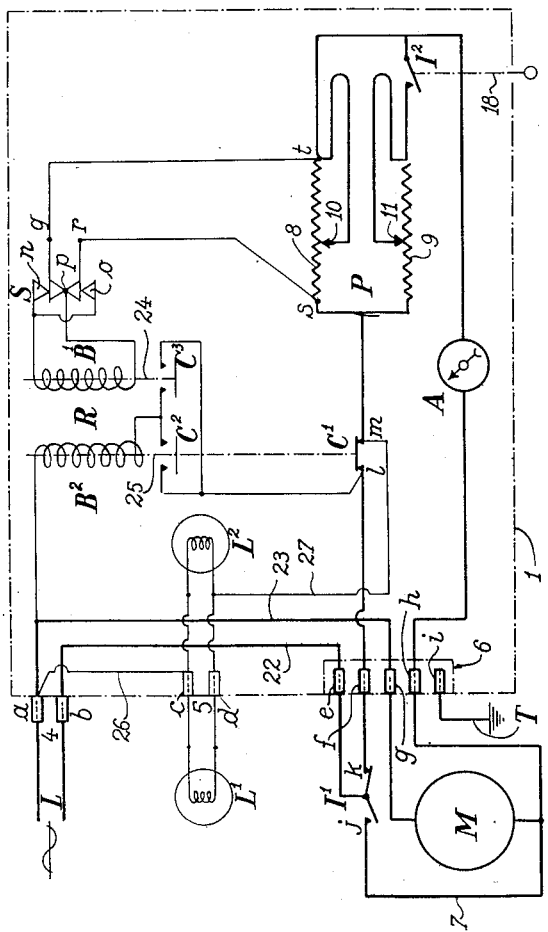
Fig. 4 is a diagramatic view of the electric connections.

According to the illustrated embodiment, the apparatus comprises a case 1 which has rectangular sides and forms a small valise provided with a cover 2 forming one of the large sides. A hand grip 3 enables this valise to be carried.

One of the small sides of this valise comprises three electric plugs 4, 5, and 6 comprising respectively:

The plug 4, two terminals $a$ and $b$ connected to a supply line L of alternating or direct current;

The plug 5, two terminals $c$ and $d$ permitting the connection of an outer signal lamp $L^1$;

The plug 6, five terminals $e, f, g, h, i$.

The terminals $e$ and $f$ connect the lever and the stud $k$ of a reversing switch $I^1$ having two studs $j$ and $k$.

The terminals $g$ and $h$ connect the terminals of the motor M to control, the terminals $h$ and $j$ being, furthermore, connected by a conductor 7.

The terminal $i$ is connected to earth at T.

Inside the apparatus are disposed:

(a) A double potentiometer P having two resistances 8 and 9 of which the respective slides 10 and 11 are rigidly connected to a nut 12. A screw 13 having a control knob 14 displaces this nut behind a window 15 provided with graduations 16 and 17 (Fig. 2).

(b) A switch I² having an operating member 18 which permits putting the variable resistance 9 in parallel with the variable resistance 8 or isolating this resistance 9. The upper graduation 16, which ranges for example from 1 to 5 amps., corresponds to the resistance 8 which is alone conected to the circuit, whereas the graduation 17, which for example ranges from 5 to 10 amps., corresponds to the connection in parallel of the two sections of the potentiometer when the switch I² is closed.

(c) A double relay R described hereinunder.

(d) An ammeter A the dial 19 of which is visible through a window 20.

(e) A second signal lamp L² visible through a dome 21.

A detailed view of the double relay R and the connections inside the apparatus are shown in Fig. 4. In this figure the two supply circuits of the motor M are shown in thick line.

The starting circuit for the motor comprises, starting from the terminal $b$ of the supply plug 4, a conductor 22, the terminal $e$, the lever of the reversing switch I¹, its stud $j$, the conductor 7, the motor M, the terminal $g$, another conductor 23, and the terminal $a$.

The other circuit for normal operation of the motor comprises the terminal $b$ of the supply plug 4, the terminal $e$, the lever of the reversing switch I1, its stud $k$, the terminal $f$, the input terminal $l$ of a main switch C¹, the output terminal $m$ of this switch, the resistance 8 of the potentiometer, and, if desired, the resistance 9 connected in parallel if the switch I² that controls this resistance is closed, the ammeter A, the terminal $h$, the motor M, the terminal $g$, the conductor 23, and the terminal $a$ of the supply plug.

The movable member of the switch C¹ is controlled by a relay comprising a main coil B¹ having a plunger 24 and an auxiliary coil B² having a plunger 25. This member of the switch C¹ is connected to the plunger 25 of the coil B². The latter is directly connected to the terminal $a$ of the plug 4 and its circuit may be closed on the other terminal $b$ of this plug through the medium of one or the other of the two auxiliary switches in parallel C² and C³ and through the terminals $f$, $k$ (of the switch I¹) and $e$.

The movable member of the switch C² is connected to the plunger 25 of the coil B² in such manner that when the latter is excited the switch C¹ is opened and the switch C² closed.

The movable member of the switch C³ is connected to the plunger 24 of the main coil B¹. The latter is connected in parallel to the two end terminals $n$ and $o$ and to the central terminal $p$ of a dry rectifier S. The intermediate terminals $q$ and $r$ (the alternating current side) are connected to the ends $s$ and $t$ of the resistance 8 of the potentiometer P, so that the coil B¹ is in fact connected in parallel to the ends of said potentiometer P.

The coil B¹ and the switch C³ are so adjusted that this switch closes for a given rectified voltage V at the terminals of the coil, this voltage corresponding to a given current intensity.

The inner lamp L² is connected, in parallel with the outer lamp L¹, to the terminals $c$ and $d$ of the plug 5. A conductor 26 connects the terminals $a$ and $c$ and another conductor 27 connects the terminal $d$ to the terminal $m$ of the main switch C¹.

In practice, the two coils B¹ and B², their switches and the rectifier are assembled in the form of a single unit and form a single relay connected to a base 28 (Fig. 3) disposed at the bottom of the valise, so that in the event of an accident this movable unit may be removed and another unit put in its place.

The apparatus operates in the following manner:

For starting up the motor, the lever of the switch I¹ is placed on the stud $j$, the motor M starts up directly on its aforementioned first circuit.

After this operation the lever of the reversing switch I¹ is placed on the stud $k$, the current then passes through the switch C¹, the potentiometer P, the ammeter A, and the electric motor M, in the aforementioned second circuit.

The coil B¹ is fed with a rectified voltage that is governed by the position of the slide 10.

It is easily seen that, for a given switch-closing voltage, this voltage will be obtained for values of the rectified intensity which are inversely proportional to the value of the resistance 8 in use. Since this coil B¹ is fed with direct current, it is possible to obtain, by a suitable choice of the resistance, the operation of the relay for any desired value of the intensity. This is possible with great precision owing to the great ease with which it is possible to adjust the regulating resistance 8. It is a simple question of the sizes of the resistances of the potentiometer P.

In practice, there is no need to start from zero since it must be taken into account that the motor M consumes a certain current when on no load.

When the maximum voltage V has been attained, which corresponds to the required maximum torque for beading, the current in the coil B¹ causes the closing of the switch C³ and the coil B² is fed at the main voltage through the circuit $a$, C³, $l$, $f$, $k$, $e$, $b$ whereas the switch C¹ is opened by this coil B². The motor M of the beading apparatus therefore stops, the plunger 24 of the coil B¹ falls but the coil B² is still supplied, through its switch C² which is still closed.

The signal lamps L¹ and L² which were illuminated in the position corresponding to normal operation go out as soon as the motor M stops.

In order to effect a new beading operation it is necessary to move the switch I¹ onto the stud $j$, the coil B² is then no longer supplied and the apparatus returns to the initial position.

It is obvious that the coupling of the two sections of the potentiometer in parallel by operating the switch I² permits the operation of the coil B¹ for a double intensity, since the resistance of the potentiometer is in this case halved.

The ammeter A indicates the intensity of operation and also indicates to the operator the proper operation of the apparatus.

Although a specific embodiment of the invention has been described it is to be understood that many changes and modifications may be made therein without departing from the spirit of the invention or the scope of the appended claim.

Having now described my invention what I claim as new and desire to secure by Letters Patent is:

In a control apparatus for an electric motor, and particularly for a motor for beading operations, in combination: a main supply circuit for the normal operation of said motor; in series in said main supply circuit, a main switch having a movable member, an adjustable potentiometer, a manually operated interruptor adapted to open and close said main circuit; a relay for operating said main switch, said relay comprising a first auxiliary switch having a first movable member, a second auxiliary switch having a second movable member, a main coil having a plunger connected to said first movable member of said first auxiliary switch, the winding of said main coil being connected to the terminals of said potentiometer in such a manner that said first auxiliary switch is closed when a current of a given intensity depending upon the adjustment of said potentiometer passes through said main coil, an auxiliary coil having a plunger connected to said main switch and to said second auxiliary switch in such a manner that when said auxiliary coil is excited said second auxiliary switch is closed and the said main switch is open; the feed circuit of said auxiliary coil comprising in parallel said first movable member and said second movable member, whereby, as said auxiliary coil is excited by the momentary closure of said first auxiliary switch connected to the plunger of said main coil, as soon as the current in said main coil reaches said intensity, said auxiliary coil is kept excited by means of its own second auxiliary switch, to keep the main switch open until said interruptor is open, which excites said auxiliary coil and closes the said first auxiliary switch and said main switch.

References Cited in the file of this patent

UNITED STATES PATENTS

| | | |
|---|---|---|
| 416,632 | Leber | Dec. 3, 1889 |
| 1,172,821 | Meyer et al. | Feb. 22, 1916 |
| 1,539,429 | Sartig | May 26, 1925 |
| 2,080,502 | Pedatella | May 18, 1937 |
| 2,419,462 | Petch et al. | Apr. 22, 1947 |
| 2,611,114 | Fisher | Sept. 16, 1952 |